C. H. THORDARSON.
ELECTRIC MEASURING INSTRUMENT.
APPLICATION FILED JUNE 27, 1910.

1,016,303.

Patented Feb. 6, 1912.

2 SHEETS—SHEET 1.

Witnesses:
Harry S. Guither
William Goldberger.

Inventor:
Chester H. Thordarson
by William L. Hall
atty

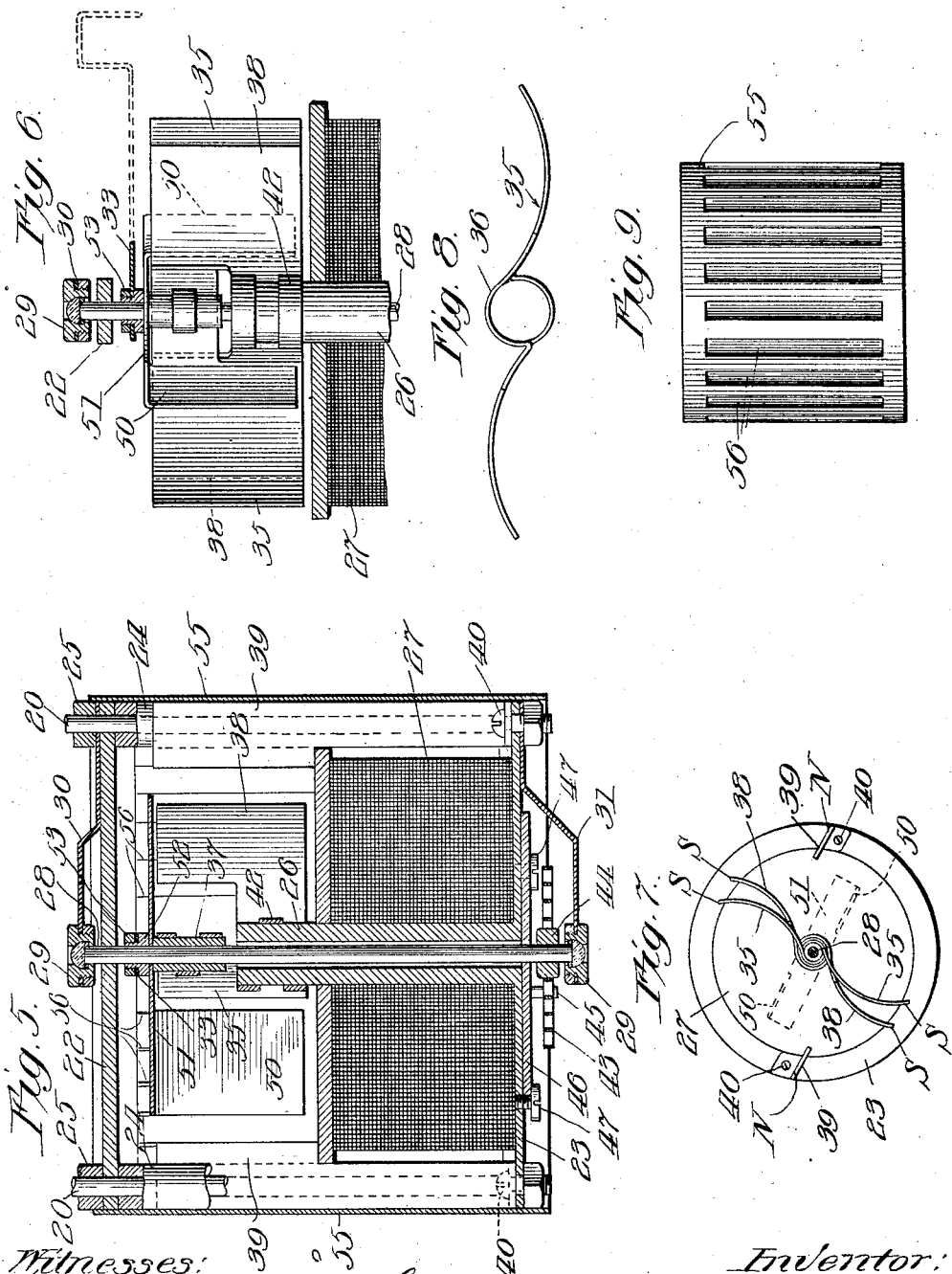

UNITED STATES PATENT OFFICE.

CHESTER H. THORDARSON, OF CHICAGO, ILLINOIS.

ELECTRIC MEASURING INSTRUMENT.

1,016,303.  Specification of Letters Patent.  Patented Feb. 6, 1912.

Application filed June 27, 1910. Serial No. 569,045.

*To all whom it may concern:*

Be it known that I, CHESTER H. THORDARSON, a citizen of the United States, and a resident of Chicago, in the county of Cook and State of Illinois, have invented certain new and useful Improvements in Electric Measuring Instruments; and I do hereby declare that the following is a full, clear, and exact description thereof, reference being had to the accompanying drawings, and to the characters of reference marked thereon, which form a part of this specification.

This invention relates to improvements in electric meters, and relates also to means associated with such meters for controlling electric circuits.

The meter herein shown has been devised for use in a storage battery power and charging equipment, such as is illustrated in my co-pending application for United States Letters Patent filed of even date herewith, Serial Number 569,046. In this use of the meter it is connected in the charging circuit or load circuit, or both, for the purpose of indicating the potential of the storage batteries, and also for the purpose of controlling the operation of a switching mechanism that controls the switching of the storage batteries from the charging circuit to the load circuit, and vice versa. The essential elements of the meter may be employed wherever it is desired to measure the pressure or volume of electric current, and the circuit controlling element of the device may be employed for many uses where a device of this kind is adaptable.

The invention consists in the matters hereinafter set forth and more particularly pointed out in the appended claims.

Figure 1:
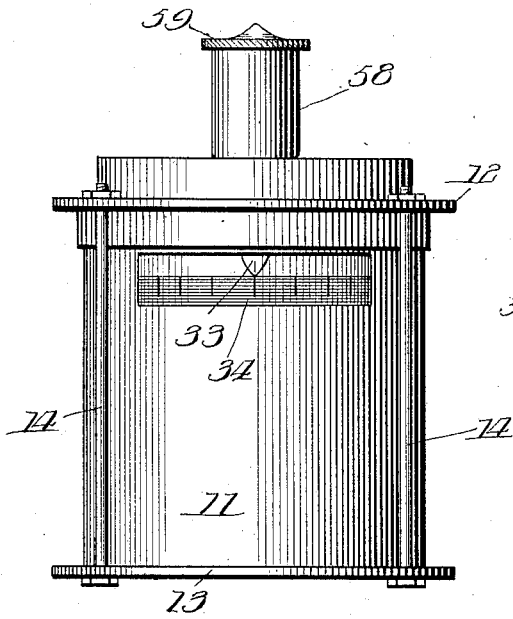
Figure 2:
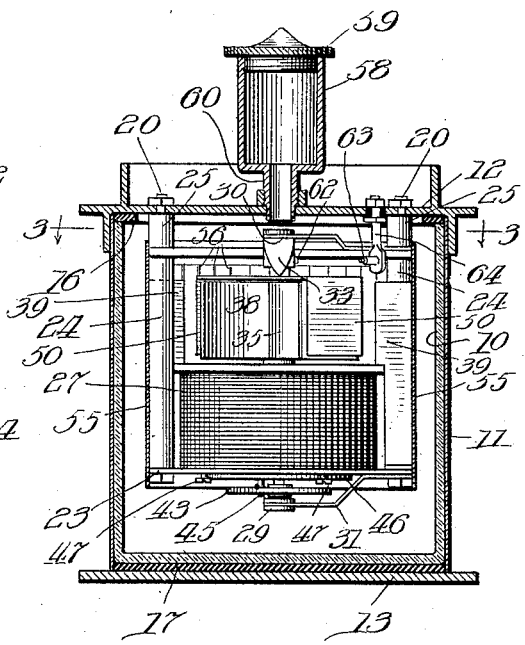
Figure 3:
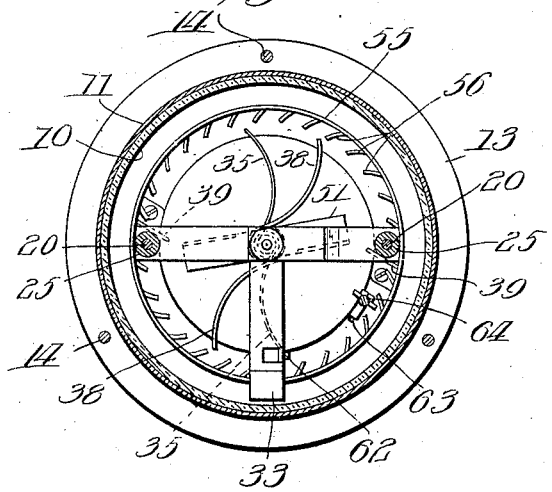
Figure 4:
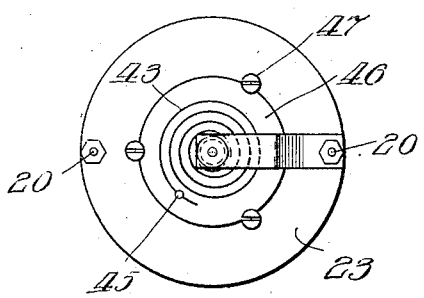

In the drawings, Figure 1 is a side elevation of a meter embodying my invention. Fig. 2 is a partial vertical section and partial elevation thereof. Fig. 3 is a horizontal section on the line 3—3 of Fig. 2. Fig. 4 is a bottom plan view of the meter mechanism proper, with the casing omitted. Fig. 5 is an enlarged axial section of the internal part of the meter. Fig. 6 is a view partially in elevation and partially in section of the upper part of the meter mechanism. Fig. 7 is a diagrammatic view of the essential elements of the meter. Fig. 8 is an edge elevation of the meter vane. Fig. 9 is an elevation of a winged retarding cylinder surrounding the meter mechanism within the meter chamber.

The meter mechanism is submerged in a body of liquid, such as a heavy petroleum, contained in a glass jar 10, which latter is protected by a metal casing 11 closed at its upper and lower ends by the top and bottom plates 12 and 13. Said plates are clamped to the cylinder by means of the clamping rods 14, 14 shown in Figs. 1 and 3. Cushions, comprising the washer 16 and the disk 17, are interposed between the upper and lower ends of said jar and the upper and lower plates 12 and 13, respectively, to cushion the metal against the glass and the washer constitutes a packing ring to provide a liquid tight joint at the top of the jar.

The meter mechanism is suspended in the body of the liquid from the top wall 12 by means of the vertical rods 20, 20. The said rods comprise parts of the meter frame, which frame embraces in addition thereto the upper brass bar 22 and the lower iron plate 23 through which the rods 20 extend, and brass spacing sleeves 24, 25 which surround said rods 20 and are interposed between said bar and plate and the bar 22 and the top plate 12 of the meter casing. Made integral with and extending upwardly from the lower iron plate 23 is a hollow post 26, the lower end of which is surrounded by an electro-magnetic coil 27.

Extending upwardly through the hollow post 26 and through openings in the plate 23 and bar 22 is an iron shaft 28 which is mounted for rotation at its upper and lower end in bearing boxes 29, 29 that are carried by the outer or free ends of spring arms 30, 31, respectively, which are attached to one of the frame rods 20. Said rotative shaft 28 carries an indicator arm 33, the outer hooked end of which coöperates with a suitable scale 34 on the glass jar receptacle that is exhibited through an arcuate opening in the shell or casing 11. The shaft 28 also carries at its upper end a swinging double-arm vane 35 of the shape shown in Figs. 3, 7 and 8. Said vane may be made of sheet iron and is formed at its central portion to provide a hub 36 that fits over a sleeve 37 which is fitted tightly to the upper end of the shaft 28. The arms of said vane 35 swing or vibrate between the arms of a fixed, two-arm, iron plate 38, of the same shape as the vane, and two vertical iron plates 39, 39 arranged diametrically opposite each other adjacent to the spacing sleeves 24 and attached to the lower iron frame plate 23 by the screws 40. The two-arm plate 38 is formed between its ends to provide a hub 42 which fits tightly over the upper end of the hollow post 26. The double-arm vane is downwardly notched at its central portion to interfit with the upwardly notched central portion of the two-arm fixed plate 38, said vane crossing the fixed plate, with one of its arms in front of one arm of said plate and with its other arm in rear of the other arm of said plate, as most clearly shown in Figs. 5, 6 and 7. The mounting of the double-arm vane at its center balances the vane and adds to the delicacy of operation to the meter.

The pointer is held in its normal zero position by means of a volute spring 43 below the lower frame plate 23, the spring being attached at one end to a collar 44 fixed to the lower end of the shaft 28, and is attached at its other end, by means of a pin 45, to a disk 46. Said disk is fixed to the bottom frame plate 23 by means of screws 47, the heads of which overlap the margin of the disk. This arrangement provides means for adjusting the tension of said spring, the adjustment being effected by releasing the screws 47, rotating the disk about its axis and afterward locking the same fixed by said screws.

The fixed two-arm plate 38 constitutes the pole of one sign of a magnet, and the plates 39, 39 constitute poles of the opposite sign of the magnet. The swinging double-arm vane 35 is of the same magnetic sign as the fixed or stationary plate 38, by reason of its attachment to the shaft 28 that extends through the hollow post 26. When the coil 27 is energized, therefore, the two arms of the vane 35 are repulsed by the fixed pole plate 38 and swing away from said plate toward the pole plates 39, 39 of the opposite magnetic sign. The repulsion between the parts of like signs and the simultaneous attraction between the parts of opposite signs operate on the two-arm vane in the same direction to move the indicator arm over its dial. This arrangement of the pole plates between which the two-arm vane vibrates has the effect to produce an approximately uniform extent of movement of the vane and the meter arm for each unit of current measurement, for the reason that as the arms of the vane move away from the arms of the fixed pole plate under the magnetic repulsion of like signs of the magnet, it is moving into the influence of the attractive force of the plates 39 of unlike signs; and as the repulsive force diminishes the attractive force increases. When the vane arms first begin to move out from the arms of the two-arm pole plate 38 they are acted upon little or none by the attractive force of the pole plates 39; but when said arms begin to come into the attractive influence of the pole plates 39, the sum of the repulsive and attractive forces is approximately equal in effect to that of the repulsion between the plates 35 and 38 when the arms of the vane first begin to swing outwardly; and as the arms of the vane approach the pole plates 39, the attractive force between the parts of opposite signs preponderates until the vane is brought almost wholly under the influence of said attractive force. Thus the meter dial may be marked with substantially uniformly spaced graduations from end to end. This renders the reading of the meter more accurate than if the graduations be irregularly spaced, which would occur if the double-arm vane be acted upon solely by a single pole of the magnet.

The body of liquid in the meter chamber has a dampening effect on the movement of the vane 35 in a manner to steady the action of the meter and to avoid abrupt movements of the indicator arm 33. This steadying action is especially desirable in the use of the meter mechanism to control an electric circuit, inasmuch as it avoids the closing of the circuit upon a momentary increase of potential of the circuit, but slows the movement of the parts so as to balance such movement to the average potential of the current. This dampening effect may be still further increased by the employment of supplemental vanes or wings 50, 50, which are formed on the opposite margins, and at the opposite ends, of a horizontally arranged plate 51 attached to and turning with the shaft 28. Said plate is shown as confined between the upper end of the sleeve 37 and a collar 52 that has a tight slip fit on the shaft. The indicator arm 33 is confined between said collar and a nut 53 that is screw-threaded to the reduced upper end of the collar.

In order to retard the rotative movement of the liquid within the meter chamber as the vane is turned, and thus increase the dampening effect of the liquid, I may provide the winged cylinder 55 which surrounds the meter mechanism. The said cylinder may be made of non-magnetic sheet metal and be provided with inwardly turned wings 56 formed by cutting longitudinal areas of the metal away at one side and at the ends thereof and turning them inwardly about their attached or integral sides. This construction provides openings in the cylinder through which the liquid may pass from one side to the other. The presence of said wings prevents the body of fluid rotating freely with the vane as the latter is turned, the wings acting to break up the fluid body and to retard its motion.

The liquid chamber of the meter may be filled through an enlarged filling nozzle 58 provided at its top with a removable screw-threaded cap 59 and at its bottom with a short nipple 60 screw-threaded into the top plate 12 of the meter chamber, and by which the nozzle communicates with said chamber. The filling nozzle is made of a size to retain therein a supplemental body of liquid by which to replenish the body of liquid in the meter chamber in case of its leakage or evaporation therefrom, and to allow for expansion and contraction of liquid.

In order to adapt the meter described to control an electric circuit, the meter arm is provided with a contact point 62 which is adapted to engage, when at the limit of its movement, a contact point 63 carried by a short, vertical rod 64 which is attached to and insulated from the top plate 12 of the meter chamber. When said contact point 62 reaches contact point 63 a circuit is closed through conductors which are connected to a binding post at the top of the rod 64 and a binding post at the top of the adjacent rod 20. When the circuit is to be closed at the point of maximum potential of the current, the contact point 63 is located adjacent to the highest point of the dial, and is located adjacent to the lowest point on the dial when the controlled circuit is to be closed at a predetermined minimum potential.

I claim as my invention:—

1. An electric measuring instrument comprising an electromagnet, said magnet having two outer poles of like sign, a meter indicator arm and two inner poles of like sign but dissimilar to the outer poles, a pivoted, double-arm, balanced member for actuating the meter indicator arm arranged to swing about the center of the inner poles of the magnet toward the two outer poles thereof, said inner poles being arranged adjacent to and generally parallel with, and of the same magnetic sign as the swinging member.

2. An electric measuring instrument comprising an electro-magnet embracing two diametrically opposed members and an intermediate member, and an electro-magnetic coil, the intermediate member constituting a pole of one sign of the magnet and the outer members constituting poles of the opposite polarity of said magnet, the intermediate member being provided with a two-arm fixed plate, and a balanced, double-arm, swinging vane pivoted between the outer members and of the same magnetic sign as said plate, for actuating the meter indicator arm, the arms of the vane being adapted to vibrate between the arms of said two-arm plate and the outer members.

3. An electric measuring instrument comprising a frame having magnetically connected, diametrically disposed side members and a central member, a coil surrounding the central member, the central member constituting a pole of one sign of a magnet and the side members the poles of opposite sign of said magnet, pole plates fixed to the frame adjacent to the side members, a two-arm pole plate fixed to the central member, a swinging, double-arm vane pivoted on the axis of the central member for actuating the meter arm and of the same magnetic sign as said central member, the arms of which vibrate between the arms of the fixed plate of the central member and the fixed plates of the side members.

4. An electric measuring instrument comprising a frame having magnetically connected, diametrically disposed side members and a central, tubular member, a coil surrounding the central member, the central member constituting the pole of one sign of a magnet and the side members constituting poles of opposite sign of said magnet, a rotatively mounted shaft extending upwardly through the central tubular member, a double-arm vane fixed to the upper end of said shaft, a two-arm plate fixed to the central tubular member and normally adjacent to and of the same magnetic sign as said vane, and an indicator arm carried by said shaft.

5. An electric measuring instrument comprising a frame having magnetically connected, diametrically disposed side members and a central, tubular member, a coil surrounding the central member, the central member constituting the pole of one sign of a magnet and the side members constituting poles of opposite sign of said magnet, a shaft extending through said central member, spring arms fixed to the frame and carrying bearings in which the ends of the shaft are rotatively mounted, a two-arm plate fixed to the central, tubular member, a double-arm vane fixed to the upper end of said shaft, said vane being arranged in crosswise relation to said two-arm plate and of the same magnetic sign as said plate and normally adjacent thereto, the arms of said vane being swingable between the arms of said two-arm plate and the side members.

6. An electric measuring instrument comprising a frame having magnetically connected, diametrically disposed side members and a central, tubular member, a coil surrounding the central member, the central member constituting the pole of one sign of a magnet and the side members constituting poles of opposite sign of said magnet, a rotatively mounted shaft extending upwardly through the central, tubular member, a double-arm vane fixed to the upper end of said shaft, a two-arm plate fixed to the central, tubular member and normally adjacent to and of the same magnetic sign as said vane, an indicator arm carried by said shaft, a restoring spring applied to said shaft and means for adjusting the tension of said spring.

7. An electric measuring instrument comprising a frame having magnetically connected, diametrically disposed side members and a central, tubular member, a coil surrounding the central member, the central member constituting the pole of one sign of a magnet and the side members constituting poles of opposite sign of said magnet, a rotatively mounted shaft extending upwardly through the central, tubular member, a double-arm vane fixed to the upper end of said shaft, a two-arm plate fixed to the central, tubular member and normally adjacent to and of the same magnetic sign as said vane, an indicator arm carried by said shaft, a volute restoring spring attached at one end to said shaft, and a disk adapted to rotate about its axis and to be fixed to the meter frame to which the other end of said spring is attached.

8. An electric measuring instrument comprising upper and lower plates, rods extending through said plates, sleeves surrounding said rods and interposed between the plates for spacing the same, a centrally arranged hollow post extending upwardly from the lower plate, an electro-magnetic coil surrounding said post, a rotatively mounted shaft extending through said post, a fixed two-arm plate carried by the upper end of said post, plates at the sides of said sleeves fixed to the lower plate, a double-arm vane fixed to the upper end of said shaft arranged in crossed relation to said fixed two-arm plate and normally adjacent to said two-arm plate and adapted to vibrate between the latter plate and the outer plates, said vane being of the same magnetic sign as the two-arm plate and of unlike sign to said outer plates.

9. An electric measuring instrument comprising a casing having means whereby liquid may be supplied thereto, an electromagnet within said casing comprising an iron plate having two oppositely located pole pieces of the same sign and an intermediate pole piece of the opposite sign, the latter pole piece having fixed pole plates or extensions, a coil surrounding the latter pole piece and a double-arm vane pivoted in the axis of the intermediate pole piece and swingable between said pole plates and the oppositely located pole pieces, said meter parts being adapted to be submerged in a body of liquid within said casing.

10. An electric measuring instrument comprising a casing adapted to contain a body of liquid and having means whereby liquid may be supplied thereto, and a meter mechanism in said casing embracing an electro-magnet, an indicator arm, a rotative shaft carrying said indicator arm, a balanced, double-arm magnetic vane carried by said shaft and swingable between the poles of said magnet and a dampening wing carried also by said shaft at an angle to the vane, the vane and wing being submerged in said liquid.

11. An electric measuring instrument comprising a closed casing adapted to contain a body of liquid and having means whereby liquid may be supplied thereto, a meter mechanism in said casing having a swinging, magnetically actuated indicator arm actuating member that is submerged in the liquid, and retarding means for preventing the liquid rotating in the casing with said actuating member.

12. An electric measuring instrument comprising a closed casing adapted to contain a body of liquid and having means for supplying liquid thereto, and an internally winged cylinder surrounding the meter mechanism, between the same and the casing wall.

13. An electric measuring instrument comprising a closed casing adapted to contain a body of liquid and having means for supplying liquid thereto, and a perforated, internally winged cylinder surrounding the meter mechanism, between the same and the casing wall.

In testimony, that I claim the foregoing as my invention I affix my signature in the presence of two witnesses, this 2nd day of June A. D. 1910.

CHESTER H. THORDARSON.

Witnesses:
W. L. HALL,
WILLIAM GOLDBERGER.

---

Copies of this patent may be obtained for five cents each, by addressing the "Commissioner of Patents, Washington, D. C."